United States Patent [19]

Sanger et al.

[11] Patent Number: 5,329,297
[45] Date of Patent: Jul. 12, 1994

[54] PROOF PRINTER CAPABLE OF PRINTING WITH VARIOUS SWATH WIDTHS

[75] Inventors: Kurt M. Sanger, Rochester; Thomas A. Mackin, Hamlin; Michael E Schultz, Rochester; Thomas J. DeClerck, Pittsford; Scott L. Auer, Webster; Michael J. O'Brien, Farmington, all of N.Y.

[73] Assignee: Eastman Kodak Company, Rochester, N.Y.

[21] Appl. No.: 749,029

[22] Filed: Aug. 23, 1991

[51] Int. Cl.⁵ .......................... G01D 15/10; H04N 1/21
[52] U.S. Cl. .................................. 346/76 L; 346/108; 358/298
[58] Field of Search ......... 358/298; 346/76 L, 107 R, 346/108

[56] References Cited

U.S. PATENT DOCUMENTS

| | | | |
|---|---|---|---|
| 4,571,602 | 2/1986 | De Schamphelaere et al. | 346/108 X |
| 4,698,691 | 10/1987 | Suzuki et al. | 358/283 |
| 4,855,752 | 8/1989 | Bergsteot | 346/140 R X |
| 4,965,593 | 10/1990 | Hickman | 346/140 R |
| 4,965,599 | 10/1990 | Roddy et al. | 358/298 X |
| 4,967,203 | 10/1990 | Doan et al. | 346/140 R X |
| 4,999,646 | 3/1991 | Trask | 346/140 R X |
| 5,053,791 | 10/1991 | Baek et al. | 346/76 L X |
| 5,124,720 | 6/1992 | Schantz | 346/140 R X |
| 5,164,742 | 11/1992 | Baek et al. | 346/76 L |
| 5,168,288 | 12/1992 | Baek et al. | 346/76 L |

Primary Examiner—A. T. Grimley
Assistant Examiner—Nestor R. Ramirez
Attorney, Agent, or Firm—Dennis R. Arndt

[57] ABSTRACT

A thermal printer is capable of printing proofs of images on a receiver with any of a plurality of selected half-tone dot patterns. The proof image is generated with a series of incremental dots. A plurality of the incremental dots are generated substantially simultaneously as a swath. The image is formed as a composite of a plurality of the swaths. The printer has the capability of printing with various swath widths. The swath width for a particular image is selected to preclude visible beating of the incremental dots against the selected half-tone dot pattern. Any image artifacts which are a product of interaction of the selected half-tone dot pattern and image elements (such as picket fences) are properly illustrated on the proof image. Image artifacts that are the product of interactions of the incremental dots and the half-tone dots are made invisible to the human eye.

4 Claims, 3 Drawing Sheets

PROOF PRINTER CAPABLE OF PRINTING WITH VARIOUS SWATH WIDTHS

CROSS REFERENCE TO RELATED APPLICATIONS

The present invention is related to a three co-pending U.S. Patent Applications. The first related application, Ser. No. 451,655, now U.S. Pat. No. 5,164,742 entitled "Thermal Printer, filed Dec. 18, 1989 has as its inventors S. H. Baek and T. A. Mackin and has a common assignee with the present patent application. The second related application, Ser. No. 749,381, entitled "Thermal Proof Printer", is a continuation-in-part application of the first related application. The third related application, Ser. No. 749,031, entitled "A Method of Calibrating a Multichannel Printer", has at its inventors K. M. Sanger, S. H. Baek, T. A. Mackin and M. E. Schultz, has a common assignee and is being filed concurrently with the present patent application.

1. Field of the Invention

This invention relates generally to apparatus and methods of printing half-tone proof images, and more particularly, to minimizing image artifacts in proofs.

2. Background of the Invention

When graphical information, such as photographs or artwork, is printed in a typical publication, a half-tone printing process is used. Half-tone printing is capable of producing a very high fidelity reproduction of a photograph or artwork if various parameters are chosen correctly. However, the half-tone printing process can also introduce some undesirable image distortions when printing parameters are incorrectly chosen. For example, some repetitive patterns in an image (such as a picket fence) may beat against a particular pattern of dots selected for the half-tone process. This causes objectionable repetitive variations in image density which are known as moire patterns or fringes.

In the publication field, the selection of photographs and artwork for a publication has heretofore been done by people who are indirectly involved with the process of half-tone printing. Typically, the selected images are sent to a printer so that a proof sheet can be generated. A proof sheet is made on a press which generates a half-tone reproduction of the selected images. The proof sheets, in half-tone format, are returned to the image selectors. The image selectors then determine whether or not their initially selected images are indeed suitable for the desired publication. If the images are not suitable, another round of proof sheets may be generated using different images or different half-tone printing parameters. This iterative process can be very costly and time consuming.

In order to reduce the costs of generating half-tone proofs, various forms of proof presses have been devised and used. A proof press is typically smaller and less costly to operate than a full sized printing press. It is designed so that half-tone printing can be performed in a cost-effective manner for a small number of proof sheets.

However, in spite of the improved cost effectiveness of using a proof press, there remain some substantial problems in getting images selected and ready for inclusion in a publication. For, example, a proof press is a complex and expensive piece of equipment. Consequently, proof presses are typically found only in print shops. Thus a person selecting images is still required to go through the cumbersome process of obtaining proof sheets from a source that is remote or disconnected from his or her office. Additionally, presently available proof presses do not make an exact duplicate of the half-tone reproduction which will be generated by the final press. At best a simulation is made.

A more ideal proof press would be simple to use and inexpensive enough to be placed in the offices of the selectors of images. It would also be capable of producing high fidelity predictions of the appearance of a final output of a half-tone printing press.

In one type of proof printer usable in an office setting, a simulated half-tone image is generated from digital information that is either computer generated or produced from a scanned photograph. Such a printer is described in U.S. patent application Ser. No. 451,655, filed on Dec. 18, 1989, in the names of Seung H. Baek et al. In this printer a half-tone image is generated with a seriesof incremental transfers of dye dots onto a receiver. The incremental dots are generated by lasers in a series of swaths that consist of a plurality of parallel lines. Each swath is comprised of a fixed number of lines. In this prior art printer, care is taken to assure that each line of the swath is generated with equal image density. A failure to achieve equal image density on each line may result in an image in which the swaths beat against a selected half-tone dot pattern and produce an undesirable image artifact known as banding. This banding phenomenon is most likely to occur when the half-tone dot pattern corresponds to a multiple of the swath width.

For example, the above described prior art printer produces an image with a swath width of 12 lines at a resolution of 1800 lines per inch. Thus, it has been found difficult to print half-tone patterns with a screen ruling of 133 dots per inch and a screen angle of 7.5 degrees. This can be explained by recognizing that the swath frequency is 1800/12 or 150 swaths per inch. The screen ruling in the direction perpendicular to the swath is 133/cos(7.5), or 134 dots per inch. This produces a beat frequency of 150-134 or 16 cycles per inch. This beat frequency is easily seen by a normal human eye because it is close to the peak in the eye's sensitivity (i.e., about 25.4 cycles per inch at a 10 inch viewing distance).

The phenomenon of banding can be reduced by changing a number of parameters. Obviously, a user of the printer can change the screen ruling and angle of the half-tone dots to a combination that does not beat against a resolution of 1800 incremental dots per inch and 12 line swaths. But such a change reduces the usefulness of the printer in the context of its use as a proof printer of half-tone images. If the expected final printing of the image in a publication is to be performed with a screen ruling of 133 dots per inch and a screen angle of 7.5 degrees, then a proof press must be capable of producing half-tone dots at that combination. Otherwise, the proof press would not be effective in illustrating any image artifacts that result from image components (such as picket fences) beating against the particular half-tone dot pattern.

The resolution of the incremental dots can be changed so that the beat frequency is changed to a level that is outside the range that is easily seen by a human eye. However, a proof printer with a variable resolution is one that must have very complex and costly hardware components. Such a complex machine is too expensive for use in a typical office setting.

Thus, proof printers, of the above described type, have heretofore employed various techniques for maintaining a high degree of output balance among all of the lasers used to generate a swath. In this way, the banding phenomenon has been held to a minimum and the proof press has performed its desired function, i.e., it has reproduced an image in half-tone format while accurately illustrating artifacts that resultfrom an image component interacting with a selected half-tone pattern. It has performed this function while minimizing any image artifacts that are uniquely the product of the proof printer, i.e., interactions of the incremental dot pattern with the half-tone dot pattern.

It is desirable therefore to provide a proof printer which does not initiate visually observable image artifacts as a function of its operation, but effectively illustrates image artifacts that are a function of interactions of the image using a selected pattern of half-tone dots. It is particularly desirable to provide a proof printer that is tolerant of variations in density of its printing swaths and is sufficiently simple and thus economical for use in a typical office setting.

SUMMARY OF THE INVENTION

The present invention is directed to a method and apparatus for printing proof images on a receiver with a selected half-tone dot pattern. The proof image is formed with a series of incremental dots that are produced substantially simultaneously in a swath. The swath has a selectable width. The swath width is selected to preclude visible beating of the incremental dots against the selected half-tone dot pattern.

Viewed from one aspect, the present invention is directed to an apparatus for printing an image on a receiver with multiple writing lines which are generated substantially simultaneously. The apparatus comprises a plurality of image transfer sources, means for causing relative movement between the sources and a receiver, means for selecting, from the plurality of sources, a particular number of sources to be used to generate a particular image, and means for controlling the relative movement between the sources and the receiver to compensate for changes in the particular number of the sources being used to generate the particular image.

Viewed from another aspect, the present invention is directed to an apparatus for printing a half-tone proof image on a receiver. The apparatus comprises a plurality of image transfer sources, means for causing relative movement between the sources and the receiver, means for selecting, from the plurality of sources, a particular number of sources to be used to generate a particular half-tone dot pattern for a proof image, and means for controlling the relative movement between the sources and the receiver to compensate for changes in the particular number of the sources being used to generate the particular image.

Viewed from still another aspect, the invention is directed to an apparatus for producing a proof image on a receiver with a selected half-tone dot pattern. The image is produced with incremental dots in which a plurality of the incremental dots are generated substantially simultaneously. The apparatus comprises a print head capable of producing a plurality of incremental dots substantially simultaneously. Means are provided for selecting a swath width of the incremental dots, the swath being the number of the incremental dots which are generated substantially simultaneously. The selection is made to limit beating of the incremental dots with the half-tone dot pattern selected for the proof image to outside the human visual range. Means are provided for moving the print head relative to the receiver to produce the proof image with a series of said swaths.

Viewed from yet another aspect, the present invention is directed to a method for printing an image on a receiver with multiple writing lines which are generated substantially simultaneously by a plurality of image transfer sources. The method comprises the steps of selecting, from the plurality of sources, a particular number of sources to be used to generate a particular image and producing relative movement between the sources and a receiver. Relative movement between the sources and the receiver is controlled to compensate for changes in the particular number of the sources being used to generate the particular image.

Viewed from yet another aspect, the present invention is directed to a method of producing a proof image on a receiver with a selected half-tone dot pattern with incremental dots in which a plurality of the incremental dots are generated substantially simultaneously. The method comprises the steps of selecting a swath width of the incremental dots, the swath being the number of the incremental dots which are generated substantially simultaneously. The selection is made to limit beating of the incremental dots with the half-tone dot pattern selected for the proof image to outside the human visual range. The method also includes the step of producing the proof image with a series of said swaths.

The invention will be better understood from the detailed description taken in consideration with the accompanying drawings.

The drawings are not necessarily to scale.

DETAILED DESCRIPTION

Figure 1:
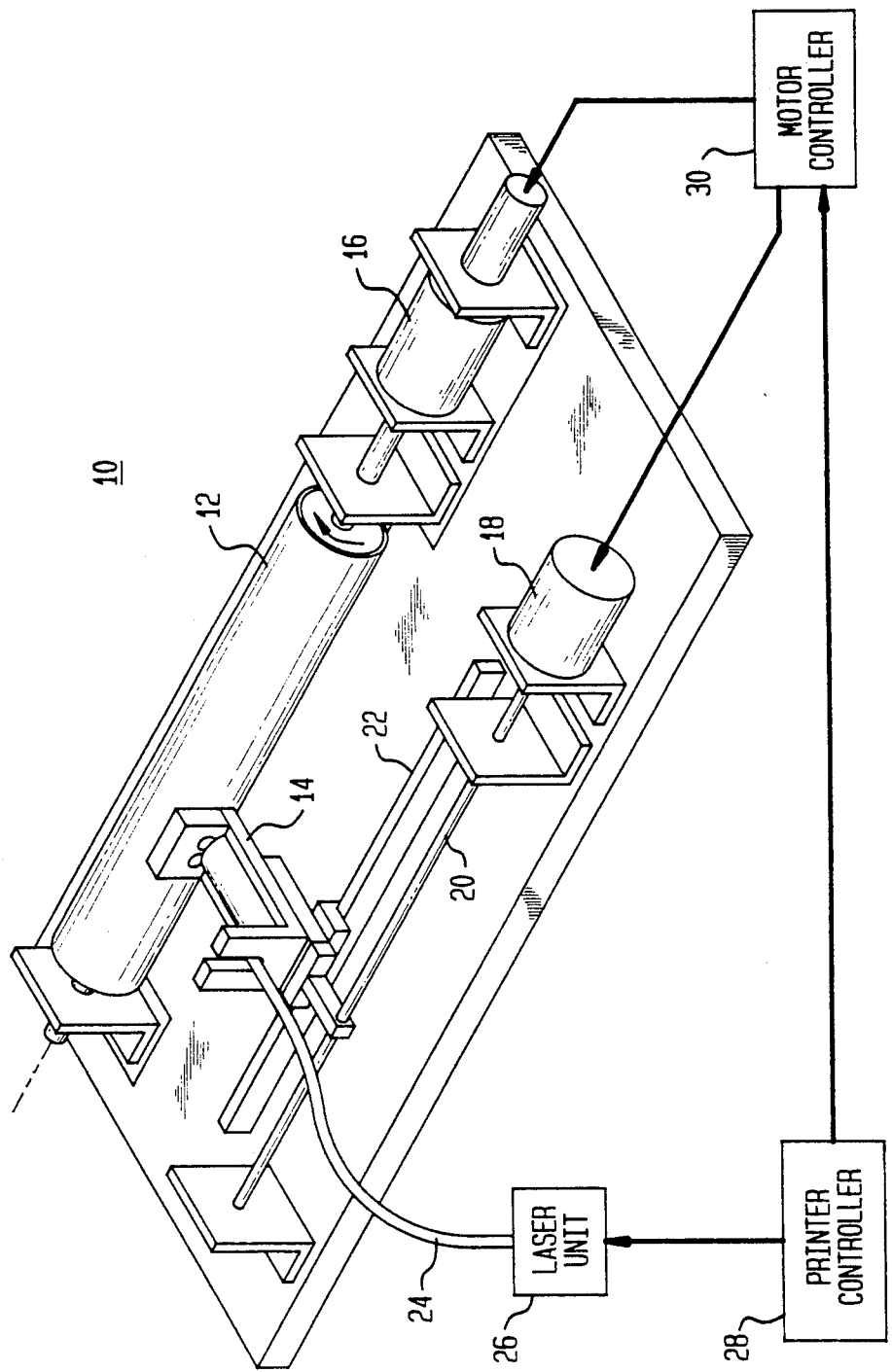
FIG. 1 is a schematic drawing of a printer in accordance with the present invention.

Referring now to FIG. 1, there is shown a printer 10 in accordance with the present invention. The printer 10 comprises a drum 12, a print head 14, a drum motor 16, a translator motor 18, a lead screw translator 20, a support rail 22, a bundle 24 of optical fibers, a laser unit 26, a printer controller 28 and a motor controller 30. The drum 12 is rotated by the motor 16. The drum 12 supports a receiver (not shown) onto which an image is transferred from dye donor sheets (not shown) by the print head 14. The print head 14 aligns-the bundle 24 of optical fibers into an array so that each fiber is focused onto the dye donor sheets. The print head 14 is moved parallel to the axis of the drum 12 as an image is formed on the receiver. The print head 14 is driven by the lead screw translator 20 which is rotated by the translator motor 18. Image information is brought to the print head 14 through the bundle 24 of optical fibers from a remote array of diode lasers (not shown) housed in the laser unit 26. The lasers are driven in a well known manner by a digital image source (not shown). The printer controller 28 is coupled at first and second outputs to inputs of the laser unit 26 and the motor controller 30, respectively. The motor controller 30 is coupled at first and second outputs to the drum motor 16 and the translator motor 18.

A more complete description of general operational aspects of the printer 10 can be found in U.S. patent application Ser. No. 451,655, filed on Dec. 18, 1989, in the names of Seung H. Baek et al. The disclosure in this application is incorporated herein by reference.

Figure 2:
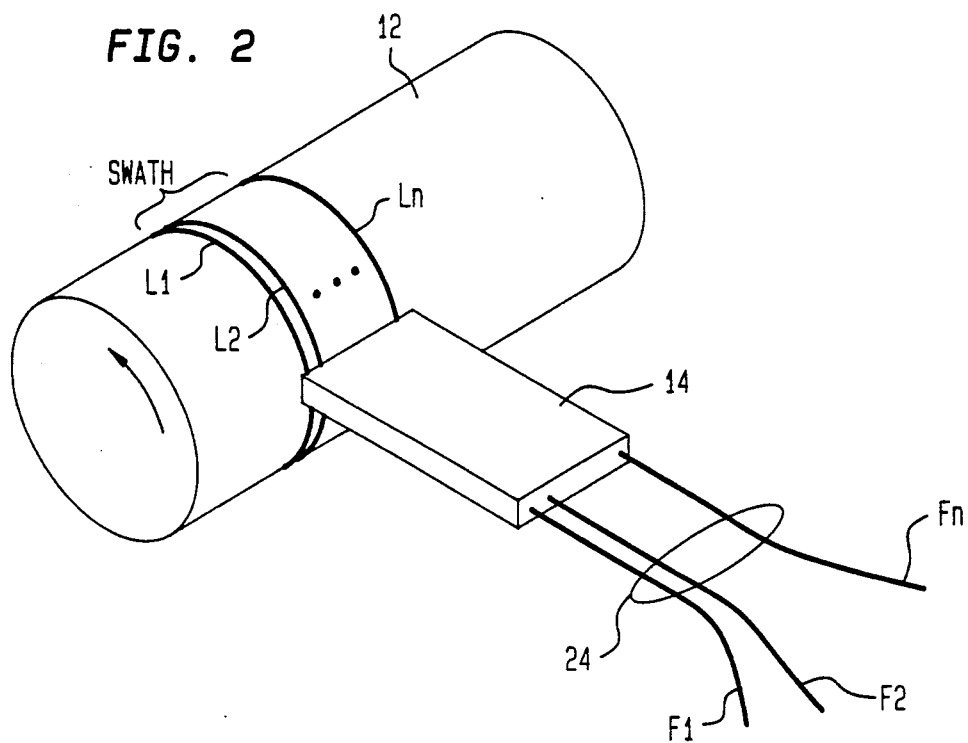
FIG. 2 is symbolic drawing of a portion of the printer of FIG. 1.

Referring now to FIG. 2 there is shown symbolical representation of the drum 12, the print head 14 and the bundle 24 of optical fibers. Each of the optical fibers is designated separately as F1, F2 and so on through Fn. Each of the optical fibers and its associated laser diode (not shown) functions as an image transfer source and is also referred to herein as a channel. FIG. 2 shows that as the drum 12 revolves, a portion of an image is produced on the receiver as series of lines L1, L2 and so on through Ln. One collection of lines L1 through Ln is referred to herein as a swath. With each revolution of the drum 12, the print head 14 produces one swath of the image. Each image source on the print head 14 produces a portion of the image at virtually the same time, i.e., each of the image sources operates substantially simultaneously. There are minimal time delays associated with print head angle which are disclosed in detail in the U.S. patent application Ser. No. 451,655 described in the Related Patent Applications section hereinabove.

Figure 3:
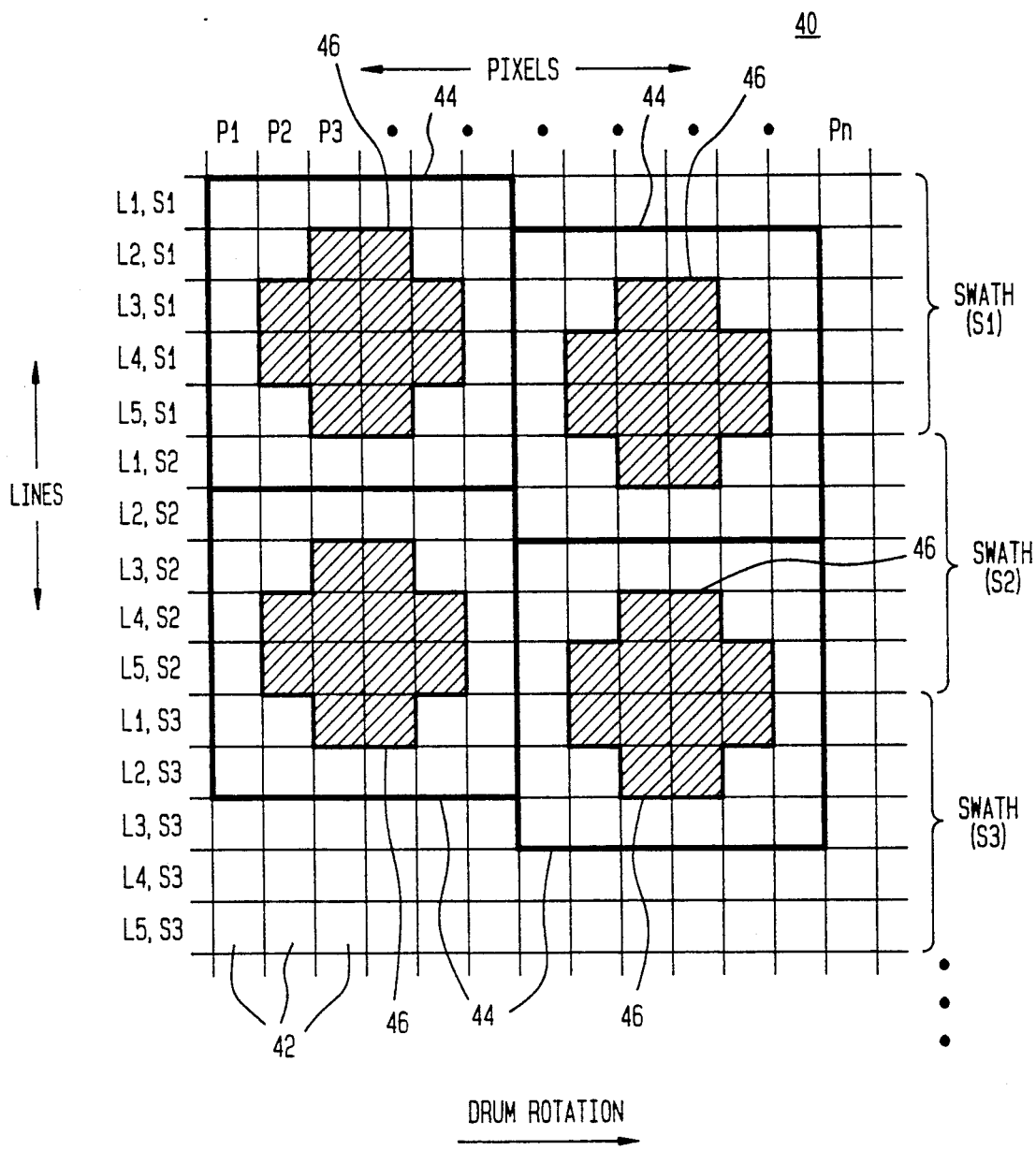
FIG. 3 is a symbolic drawing of a portion of an image in a format that is produced by the printer of FIG. 1.

Referring now to FIG. 3, there is shown symbolically a region or segment 40 of an image generated by the printer 10. The segment 40 is comprised of areas 42. Each of the areas 42 has an identifiable location determined by a line number and a pixel number. The lines have a horizontal orientation and the pixels have a vertical orientation in FIG. 3.

Within the segment 40 certain collections of the areas are designated as half-tone dot cells 44. The exact size and spacing of these half-tone dot cells 44 is determined when a particular screen ruling and screen angle are chosen by an operator of the printer 10. Within each of the half-tone dot cells 44 there is a shaded area that represents a half-tone dot 46. Each half-tone dot 46 is formed when a selected number of the areas 42 is marked with dye during the printing process. In that context, each of the areas 42 which is marked with dye can be considered as an incremental dot, and the image can be considered to be comprised of a collection of incremental dots. In the example shown in FIG. 3, there are thirty six of the areas 42 in each of the half-tone dot cells 44. Twelve of the areas 42 in each of the cells 44 is marked with dye. Consequently, each of the cells 44 can be considered to contain a 33% half-tone dot.

The example of FIG. 3 illustrates a case in which the image is generated in a series of swaths that are five lines wide. The swaths are identified as S1, S2 and S3 at the right side of FIG. 3. The lines that produced the swaths are identified at the left side of FIG. 3. A top line of FIG. 3 is identified as L1, S1. This signifies that this line is the first line (L1) of the first swath (S1). Similarly the next four lines are designated L2, S1; L3, S1; L4, S1; and L5, S1.

In FIG. 3 the swaths are shown in a configuration in which each successive swath is adjacent the next one. It is also possible to operate the printer 10 with dummy lasers in the manner described in the U.S. Patent Application entitled "Thermal Printer" which is described in the Cross Reference to Related Patent Applications section hereinabove. In that case the swaths would overlap.

In accordance with the present invention, the printer 10 of FIG. 1 has the capability of producing images with swaths that contain any number of lines. In other words, for example, the printer can produce one image on a receiver with a swath width of 10 lines and another image on a receiver with a swath width of 14 lines.

The swath width is selected to minimize any adverse effects of variations of image that may occur across the width of a swath. In other words, a swath width of 10 lines may be selected as an optimum for an image to be generated with a first half-tone dot pattern. A different image with a different half-tone dot pattern can be made with 14 line swaths, if that width is the optimum choice for the half-tone dot pattern.

As discussed in the Background of the Invention section hereinabove, a particular swath width has a particular beat frequency relative to a particular half-tone dot pattern. In order for the printer 10 to work most effectively as a proof printer, this beat frequency should be outside the range of visibility of the average human eye. Changing the number of lines in a swath changes the beat frequency for any particular half-tone dot pattern generated by the printer 10.

For example, consider the case of a half-tone dot pattern with a screen ruling of 133 lines per inch and a screen angle of 7.5 degrees. When the printer 10 operates with a resolution of 1800 incremental dots per inch, a swath width of 12 lines produces an undesirably visible beat frequency of 16 cycles per inch in a direction perpendicular to the axis of the drum 12. On the other hand, the same half-tone pattern can be printed with a swath width of 10 lines to produce a swath frequency of 180 swaths per inch. The beat frequency becomes 180-134 or 46 cycles per inch. This is a virtually invisible frequency to a normal human eye.

Thus when the printer 10 operates in a manner to produce this virtually invisible beat frequency, there is no interference with the proofing function of the printer 10. The desired half-tone screen pattern is used to produce a proof image. Any image artifacts which are associated with interactions between the image and the selected half-tone dot pattern are left to display themselves. However, there are no visible artifacts that are introduced by the interaction of the incremental dot pattern generated by the printer 10 and the half-tone dot pattern selected by the user of the printer 10.

Figure 4:
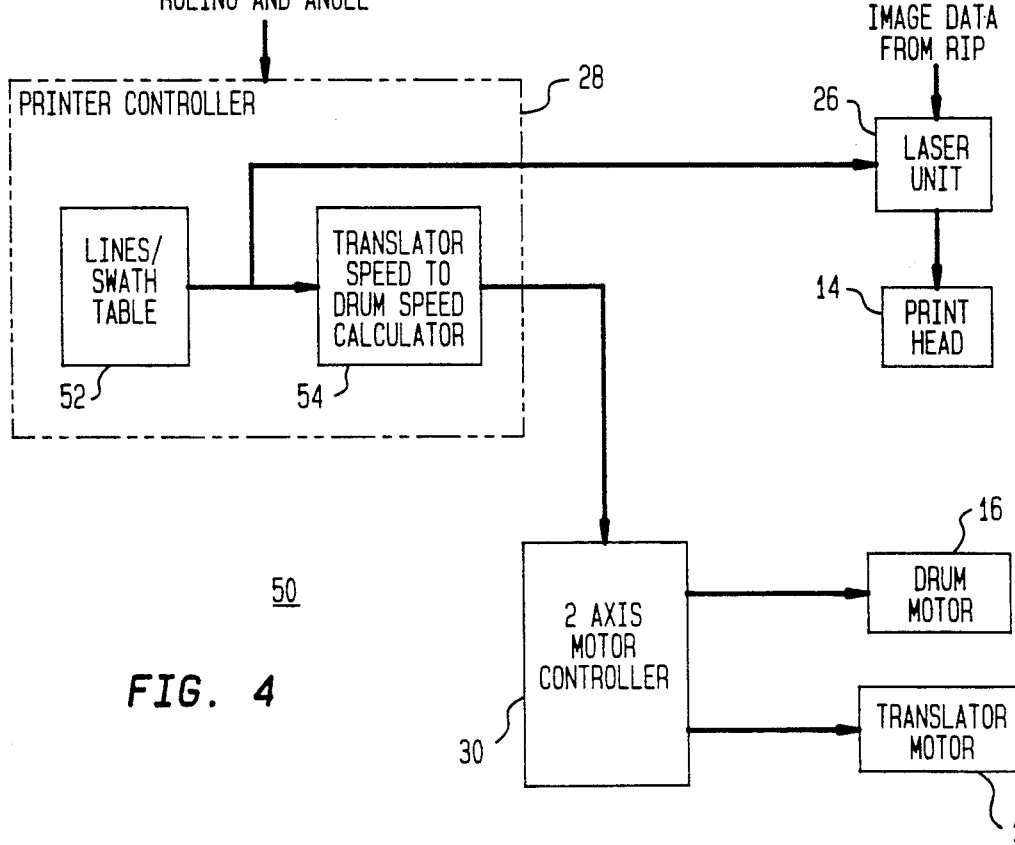
FIG. 4 is a block diagram of a control system of the printer of FIG. 1.

Referring now to FIG. 4, there is shown a preferred embodiment of a control system 50 used to produce the inventive mode of operation of the printer 10. FIG. 4 shows, in block diagram form, the printer controller 28 (shown within a dashed line rectangle), the laser unit 26, the motor controller 30, the print head 14, the drum motor 16 and the translator motor 18. Each of these elements is identified with the same number used for the corresponding element in FIG. 1. The printer controller 28 comprises a plurality of electronic devices (not shown) which are described in detail in a co-pending U.S. Patent Application entitled, "A Method of Calibrating a Multichannel Printer", which is referred to in the Related Patent Applications section hereinabove and is incorporated herein by reference. In addition to the above mentioned electronic devices, the printer controller 28 comprises an electronic table 52 and a calculator 54. The laser unit 26 comprises a data interface module, channel driver boards, laser driver boards and a series of laser diodes, all of which are not shown but are described in detail in the aforementioned copending U.S. Patent Application. The motor controller 30 is a conventional microprocessor based two-axis motor controller.

In operation, the control system 50 is initially responsive to an operator of the printer 10 of FIG. 1. A printer operator makes a selection of a particular screen ruling and screen angle for a half-tone pattern. The printer controller 28, using conventional control circuitry transmits the half-tone pattern selection to the table 52. The table 52 is a conventional electronic memory device which is loaded with a collection of lines per swath ratios. These ratios are tabulated against various half-tone dot patterns. The information contained in the table 52 is empirically determined when a first one of a particular model of one of the printers 10 is constructed. A series of trial printings is made for each half-tone pattern. Each printing is made with a different line per swath ratio. The results of the experimental printings are assessed and an optimum line per swath ratio is selected for the particular half-tone pattern. The choice of line per swath ratio involves selecting that ratio which produces the lowest printing time without permitting the printer 10 to produce visible banding that results from interaction of the incremental dots and the half-tone dots. The results of the experiments are put into the table 52 as a read only memory or any other similar memory storage device.

After the proper line per swath ratio is selected from the table 52, output information from the table 52 is transmitted to the laser unit 26 and to the calculator 54. The laser unit 26 is conditioned to print with only the number of lasers that is selected from the table 52. For example, consider the case where the laser unit 26 contains twenty lasers, but the table 52 selects thirteen lines per swath as the optimum ratio for a particular half-tone dot pattern. In that case, the laser unit 26 is set up to write with only thirteen of its twenty lasers. Additionally, if the printer 10 is to be operated with dummy lasers, the proper lasers must be assigned to the dummy function. In other words the lasers at the outside lines of the swath must be assigned to the dummy function even though this may result in the dummy lasers being at locations other than the outside of the array of lasers.

The calculator 54 uses the selected line per swath ratio to calculate a proper ratio between a speed of rotation of the drum motor 16 and the translator motor 18. The print head 14 must be advanced along the length of the drum 12 at a proper rate in order to assure that each successive swath of the image properly combines with the previous swath. This speed ratio is different for each line per swath ratio.

Output from the calculator 54 is transmitted to the motor controller 30 which provides proper signals to the drum motor 16 and the translator motor 18 to assure that these motors operate at the desired speed.

Image data is transmitted to a second input of the laser unit 26 from an image source such a conventional raster image processor (not shown). Within the laser unit 26, the image data is translated into information which is used to determine power levels and timing for each of those lasers which have been selected to generate the image.

It is to be appreciated and understood that the specific embodiments of the invention are merely illustrative of the general principles of the invention. Various modifications may be made by those skilled in the art which are consistent with the principles set forth. For example, the present invention is useful in thermal printers that operate with resistors to produce dye transfer.

We claim:

1. Apparatus for printing an image on a receiver with multiple writing lines which are generated substantially simultaneously, said apparatus comprising:
   a plurality of image transfer sources;
   means for causing a relative movement between the sources and a receiver;
   said image sources arranged to produce multiple writing lines formed of a plurality of incremental dots, said incremental dots forming half-tone image dots which produce a half-tone image wherein the fundamental harmonic of the number of lines in the swath beat against natural frequencies appearing in the subject of the image,
   means for selecting a number of adjacent sources from said plurality of image transfer sources, to generate an image;
   said means for selecting the particular number of image transfer sources comprising a look-up table in which a plurality of particular numbers of the image transfer sources are tabulated against particular half-tone dot patterns;
   calculator means for calculating the speed of the relative movement between said sources and said receiver; and
   means operative in response to said calculator means for adjusting the speed of the relative movement between said selected image transfer source and the receiver whereby the fundamental harmonic of the number of lines in the swath that beat against natural frequencies appearing in the subject of the image generate a beat frequency that is substantially invisible to the human eye.

2. The apparatus of claim 1 wherein each of the image sources comprises a laser.

3. The apparatus of claim 1 wherein the look-up table comprise optimum values for the number of image transfer sources resulting in the maximum speed of operation of the printer.

4. A method of printing an image on a receiver with multiple writing lines which are generated substantially simultaneously by a plurality of image transfer sources, said method comprising the steps of:
   selecting, from the plurality of image transfer sources, a selected number of adjacent image transfer sources to be used to generate an image;
   generating said image as a half-tone image formed by a series of incremental dots,
   moving the image transfer sources relative to said receiver;
   calculating the speed of the relative movement between said sources and said receiver; and
   adjusting the speed of the relative movement between the selected number of adjacent image transfer sources and a receiver in response to the speed calculation whereby the fundamental harmonic of the number of lines in the swath that beat against natural frequencies appearing in the subject of the image generate a beat frequency that is substantially invisible to the human eye.

* * * * *